United States Patent
Greenspan et al.

(10) Patent No.: US 9,135,312 B2
(45) Date of Patent: Sep. 15, 2015

(54) TIMESLIDER

(75) Inventors: David L. Greenspan, San Francisco, CA (US); Aaron Benjamin Iba, San Francisco, CA (US); John D. Zamfirescu-Pereira, Oakland, CA (US)

(73) Assignee: Google Inc., Mountain View, CA (US)

( * ) Notice: Subject to any disclaimer, the term of this patent is extended or adjusted under 35 U.S.C. 154(b) by 67 days.

(21) Appl. No.: 12/938,299

(22) Filed: Nov. 2, 2010

(65) Prior Publication Data

US 2015/0199411 A1  Jul. 16, 2015

Related U.S. Application Data

(60) Provisional application No. 61/257,425, filed on Nov. 2, 2009.

(51) Int. Cl.
  *G06F 17/22* (2006.01)
  *G06F 17/30* (2006.01)

(52) U.S. Cl.
  CPC ...... *G06F 17/30548* (2013.01); *G06F 17/2288* (2013.01)

(58) Field of Classification Search
  CPC . G06F 8/71; G06F 17/2288; G06F 17/30309; G06F 17/30551; G06F 17/30548
  USPC ........................ 715/229, 814, 844
  See application file for complete search history.

(56) References Cited

U.S. PATENT DOCUMENTS

| | | | |
|---|---|---|---|
| 6,181,736 B1 | 1/2001 | McLaughlin et al. | |
| 6,212,548 B1 | 4/2001 | DeSimone et al. | |
| 6,226,652 B1* | 5/2001 | Percival et al. | 707/695 |
| 6,915,336 B1 | 7/2005 | Hankejh et al. | |
| 7,071,934 B1* | 7/2006 | Faoro et al. | 715/229 |
| 7,111,044 B2 | 9/2006 | Lee | |
| 7,188,140 B1 | 3/2007 | Greenspan et al. | |
| 7,222,156 B2 | 5/2007 | Gupta et al. | |
| 7,233,951 B1 | 6/2007 | Gainer et al. | 707/10 |
| 2003/0135520 A1* | 7/2003 | Mitchell et al. | 707/200 |
| 2003/0222890 A1* | 12/2003 | Salesin et al. | 345/629 |
| 2005/0108402 A1 | 5/2005 | Colson et al. | |
| 2005/0166154 A1 | 7/2005 | Wilson et al. | |
| 2006/0064434 A1* | 3/2006 | Gilbert et al. | 707/104.1 |
| 2006/0136513 A1* | 6/2006 | Ngo et al. | 707/203 |
| 2006/0277210 A1 | 12/2006 | Starbuck | |
| 2007/0130257 A1 | 6/2007 | Bedi et al. | |
| 2007/0150829 A1* | 6/2007 | Eschbach et al. | 715/781 |

(Continued)

FOREIGN PATENT DOCUMENTS

WO   WO 2005/112374 A1   11/2005

OTHER PUBLICATIONS

Agarwal, Copy Pictures from Flickr to Picasa Web Albums (or vice-versa), Jul. 30, 2007, 2 pgs.

(Continued)

*Primary Examiner* — Shen Shiau
(74) *Attorney, Agent, or Firm* — Ropes & Gray LLP

(57) ABSTRACT

A document editing system includes a control configured to review document modifications. This control, referred to herein as a timeslider, allows a user to examine changes to a document as a function of time. The time slider is typically configured to allow review of the revision history of the document both forward and backward in time. Changes are optionally displayed in a redline format. Using the timeslider, a user can navigate through multiple modifications at a time.

19 Claims, 10 Drawing Sheets

(56) References Cited

U.S. PATENT DOCUMENTS

| | | | |
|---|---|---|---|
| 2007/0198648 A1 | 8/2007 | Allen et al. | |
| 2007/0233811 A1 | 10/2007 | Rochelle et al. | 709/219 |
| 2007/0250506 A1 | 10/2007 | Stevens et al. | 707/8 |
| 2007/0260996 A1* | 11/2007 | Jakobson | 715/781 |
| 2007/0271340 A1 | 11/2007 | Goodman et al. | |
| 2008/0177782 A1* | 7/2008 | Poston et al. | 707/102 |
| 2009/0125128 A1* | 5/2009 | Eldridge et al. | 700/86 |
| 2009/0177744 A1 | 7/2009 | Marlow et al. | |
| 2009/0199090 A1* | 8/2009 | Poston et al. | 715/255 |
| 2009/0228555 A1 | 9/2009 | Joviak et al. | |
| 2009/0271806 A1 | 10/2009 | McDonald et al. | 719/329 |
| 2010/0083230 A1* | 4/2010 | Ramakrishnan et al. | 717/121 |
| 2010/0169269 A1 | 7/2010 | Chandrasekaran | 707/608 |
| 2010/0306185 A1 | 12/2010 | Smith et al. | |
| 2011/0252301 A1* | 10/2011 | Vollmer et al. | 715/229 |
| 2012/0185762 A1* | 7/2012 | Ozer et al. | 715/229 |
| 2014/0032502 A1* | 1/2014 | Kraley | 707/663 |
| 2014/0095973 A1* | 4/2014 | Chu et al. | 715/229 |

OTHER PUBLICATIONS

Balasubramanyan, Cut Once: A Thunderbird Extension for Recipient Prediction and Leak Detection, Oct. 29, 2009, 5 pgs.

Carvalho, A Thunderbird Extension for Recipient Prediction and Leak Detection, Jan. 19, 2008, 3 pgs.

Carvalho, Ranking Users for Intelligent Message Addressing, ECIR '08 Proceedings of the IR Research, 30th European Conference on Advances in Information Retrieval, Springer-Verlag Berlin, Heidelberg, 2008, 12 pgs.

Comer, Conversation-Based Mail, ACM Transactions on Computer Systems, vol. 4, No. 4, Nov. 1986, 21 pgs.

Dear, Term-talk: Plato's Instant Messaging, Dec. 19, 2002, 2 pgs.

Dodgeball.com, Mobile Social Software, Feb. 23, 2008, 2 pgs.

Flickr, Help/The Help Forum, Anyone can tell me how to copy all photos from Flickr another album gallery from the other website?, Feb. 23, 2008, 3 pgs.

Flock Browser—Share Pictures, Text and Video, User Guides, Feb. 22, 2008, 8 pgs.

Google Inc., International Search Report and Written Opinion, PCT/US2010/28269, Jan. 26, 2011, 8 pgs.

Google Inc., International Search Report and Written Opinion, PCT/US2010/028272, Aug. 30, 2011, 8 pgs.

Google Inc., International Search Report and Written Opinion, PCT/US2010/028277, Mar. 31, 2011, 8 pgs.

Grob, Cluestr: Mobile Social Networking for Enhanced Group Communication, GROUP '09, Sanibel Island, FL, May 10-13, 2009, 10 pgs.

Hu, Microsoft wins . . . is typing a message IM patent, Oct. 8, 2003, 2 pgs.

Lavallee, Friends Swap Twitters, and Frustration, The Wall Street Journal, Mar. 16, 2007, 3 pgs.

Microsoft Office Online, Help and How-to, Move or Copy and Paste Contacts, Feb. 22, 2008, 2 pgs.

NetWin Advanced Server Software, Dbabble Instant Chat Server Overview, 2009, 3 pgs.

Nichols, High-Latency, Low-Bandwidth Windowing in the Jupiter Collaboration System, Proceedings of UIST '95, Pittsburgh, PA, Nov. 15-17, 1995, 10 pgs.

Payne, API Documentation—Twitter Development Talk, Jan. 18, 2008, 11 pgs.

Plasq, Hey plasq! Scott has an idea, I Wish I Could Drag/Drop Directly Into a File, Aug. 29, 2007, 2 pgs.

Saviano, Annagram Concurrent Text Editor, Penn Engineering, 2006, 2 pgs.

TechHit.com, SimplyFile—ntelligent Filing Assistant for Microsoft Outlook, Jun. 4, 2008, 2 pgs.

Twitter / Sifow, About Name Sifow, Feb. 22, 2008, 3 pgs.

Twitter Support, Twitter FAQ, Feb. 22, 2008, 8 pgs.

Twitter / Get a Badge for Your Site, Display Twitters on Your Web Page, Feb. 22, 2008, 1 pg.

Webb, Twitter is a Conversation Ecosystem, Chris Webb on Publishing, Media, and Technology, Feb. 22, 2008, 8 pgs.

Webb, What's the Use in Twitter? Where is the Value?, Aug. 15, 2007, 5 pgs.

Yahoo! Messenger Search Help, How do I share photos during a conversation?, Feb. 22, 2008, 1 pg.

\* cited by examiner

Figure 3

TIMESLIDER

RELATED APPLICATIONS

This application claims the benefit of U.S. Provisional Patent Application No. 61/257,425, filed Nov. 2, 2009, entitled "Timeslider," which is incorporated by reference herein in its entirety.

This application is related to U.S. patent application Ser. No. 12/431,627, filed Apr. 28, 2009, entitled "Realtime Synchronized Document Editing by Multiple Users," which is incorporated by reference herein in its entirety.

TECHNICAL FIELD

The disclosed embodiments are in the field of computing systems and more specifically in the field of version management.

BACKGROUND

Computing applications such as text editors may include undo and redo commands that allow a user to take single steps forward or backward through a history of document modifications. Text editors may also include a track changes feature that allows changes to a document to highlighted, accepted and/or deleted. Some text editors include a feature that allows two documents to be compared.

SUMMARY

Some embodiments include a control configured to navigate forward and/or backward through a revision history of a document. This control (e.g., a user interface object) is referred to herein as a "timeslider" because in some embodiments the control includes a sliding knob. The timeslider can be used to navigate through the revision history in multiple steps rather than merely one modification at a time. The timeslider is typically graphically presented in a text editor as an analog control such as a sliding knob, a rotating knob or a lever. Display logic is configured such that a magnitude of movement of the timeslider is proportional to a number of modifications navigated in the revision history. Alternatively, the magnitude of movement of the timeslider is proportional to another parameter, such as time elapsed between modifications in the revision history. A resolution of the timeslider may be user modifiable and/or may automatically change as a length of the revision history changes.

Some embodiments include logic configured for marking and manipulating points (e.g., modifications) within a revision history of a document. For example, version markers may be associated with specific modifications and the versions of the document at these modifications may be manipulated using these version markers. This manipulation can include retrieving a version, storing a version, comparing versions, checking a version out, or the like.

Various embodiments include software stored on a non-transitory computer readable medium, firmware and/or hardware. For example, some embodiments include a computing device having non-transitory storage and one or more of the above forms of logic configured to edit a document and navigate a revision history of the document. The editing logic is optionally a multi-user real-time editing system such as that disclosed in U.S. patent application Ser. No. 12/431,627, filed Apr. 28, 2009, entitled "Realtime Synchronized Document Editing by Multiple Users."

Various embodiments include a document editing system comprising: one or more processors (e.g., CPUs); document storage configured to store a document; document editing logic (e.g., instructions in an document editing application) configured for one or more editors to edit the document; revision history storage configured to store a revision history of the document; and display logic configured to execute on the one or more processors and configured to display the document to a user and to display a timeslider to the user, the timeslider being configured to navigate through the revision history.

Various embodiments include a method of editing a document, the method comprising: receiving a first series of modifications to the document; storing the first series of modifications in a revision history; storing a first historical version of the document, the first historical version being a result of the first series of modifications; receiving a second series of modifications to the document; storing the second series of modifications in the revision history; receiving an input from a timeslider; navigating the second series of revisions from the first historical version or the second historical version in accordance with a magnitude of the input from the timeslider; and providing a version of the document representative of the navigated revision.

Various embodiments include a method of managing a document, the method comprising: receiving a first series of modifications to the document; storing the first series of modifications in a revision history; storing a first historical version of the document, the first historical version being a result of the first series of modifications; receiving a second series of modifications to the document; storing the second series of modifications in the revision history; receiving a version marker designated by a user; navigating the second series of revisions to the version marker from the first historical version or the second historical version; and providing a version of the document representative of the navigated revisions.

Various embodiments include a method of managing a document, the method comprising: receiving a first series of modifications to the document; storing the first series of modifications in a revision history; receiving a version marker associated with one of the modifications of the first series; receiving a second series of modifications to the document; storing the second series of modification in a revision history; receiving a version marker associated with one of the modifications of the second series; identifying differences between a version of the document marked by the first version marker and a version of the document marked by the second version marker; and providing a version of the document having the identified differences marked.

Various embodiments include a method of managing a document, the method comprising: receiving a timeslider scaling factor representative of a resolution of a timeslider; receiving a value indicative of movement of a timeslider; multiplying the received value by the scaling factor to calculate a number of revision steps; navigating the number of revision steps to a position within a revision history of the document; and providing a version of the document representative of the position within the revision history.

In accordance with some embodiments, a computer-implemented method is performed at a server having one or more processors and memory storing one or more programs for execution by the one or more processors to perform the method. The method includes sending to a respective client a first version of a document. The method also includes receiving, from a respective client, information representing a movement of a control element displayed at the respective client system. The movement is by a user associated with the respective client. The method includes identifying a second version of the document in accordance with the received information. The second version is distinct from the first version. The method furthermore includes sending to the respective client the second version of the document.

In accordance with some embodiments, a computer-implemented method is performed at a client having one or more processors and memory storing one or more programs for execution by the one or more processors to perform the method. The method includes displaying a first version of a document and a control element. The method also includes receiving a user input moving the control element, and identifying a second version of the document in accordance with the movement of the control element. The second version is distinct from the first version. The method furthermore includes displaying the second version of the document.

In accordance with some embodiments, a server includes one or more processors, and memory storing one or more programs for execution by the one or more processors. The one or more programs include instructions for sending to a respective client a first version of a document. The one or more programs also include instructions for receiving, from a respective client, information representing a movement of a control element displayed at the respective client system. The movement is by a user associated with the respective client. The one or more programs include instructions for identifying a second version of the document in accordance with the received information. The second version is distinct from the first version. The one or more programs furthermore include instructions for sending to the respective client the second version of the document.

In accordance with some embodiments, a computer system includes one or more processors, and memory storing one or more programs for execution by the one or more processors. The one or more programs include instructions for displaying a first version of a document and a control element. The one or more programs also include instructions for receiving a user input moving the control element, and identifying a second version of the document in accordance with the movement of the control element. The second version is distinct from the first version. The one or more programs furthermore include instructions for displaying the second version of the document.

In accordance with some embodiments, a non-transitory computer readable storage medium stores one or more programs for execution by one or more processors in a server system. The one or more programs include instructions for sending to a respective client a first version of a document. The one or more programs also include instructions for receiving, from a respective client, information representing a movement of a control element displayed at the respective client system. The movement is by a user associated with the respective client. The one or more programs include instructions for identifying a second version of the document in accordance with the received information. The second version is distinct from the first version. The one or more programs furthermore include instructions for sending to the respective client the second version of the document.

In accordance with some embodiments, a non-transitory computer readable storage medium stores one or more programs for execution by one or more processors in a computer system. The one or more programs include instructions for displaying a first version of a document and a control element. The one or more programs also include instructions for receiving a user input moving the control element, and identifying a second version of the document in accordance with the movement of the control element. The second version is distinct from the first version. The one or more programs furthermore include instructions for displaying the second version of the document.

BRIEF DESCRIPTION OF THE DRAWINGS

FIG. 3 is an example of a timeslider displayed in a document editing interface in accordance with some embodiments.

DETAILED DESCRIPTION

Methods and systems for managing a plurality of versions of a document are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the embodiments herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

Figure 1A:
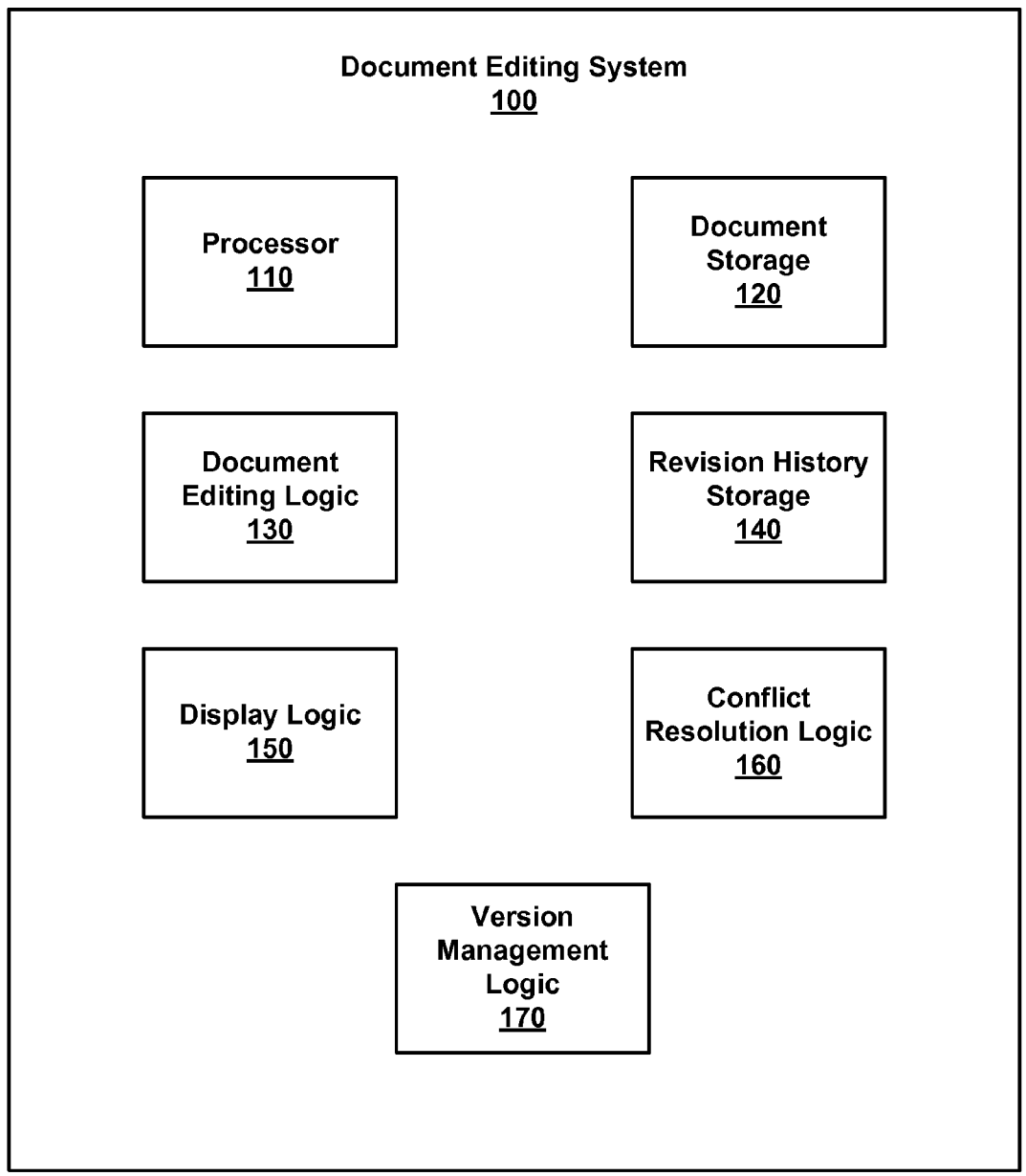
FIG. 1A is a block diagram of a document editing system in accordance with some embodiments.

FIG. 1A is a block diagram of a Document Editing System 100 in accordance with some embodiments. Document Editing System 100 is configured for editing a document via a computer interface. For example, Document Editing System 100 may include a personal computer or a server connected to a client over a network. In some embodiments, Document Editing System 100 is distributed over several computing devices. For example, parts of Document Editing System 100 may be distributed over several network connected devices, or Document Editing System 100 may include several clients each configured to display a separate user interface configured to jointly edit the same document. Document Editing System 100 is optionally configured to communicate with these clients over a communication network using TCP/IP protocols.

Document Editing System 100 includes at least one Processor 110, such as a microprocessor, central processing unit, ASIC, or the like. Processor 110 is configured to execute computing instructions encoded in hardware, firmware or software stored on a non-transitory computer readable medium. Processor 110 may be configured to perform specific logical operations by loading computing instructions into Processor 110. In some embodiments, Processor 110 is distributed among several devices.

Document Editing System 100 includes a Document Storage 120 configured to store at least one document and optionally one or more historical versions of the document. Document Storage 120 typically includes a hard drive, optical storage media, random access memory, flash memory, static memory, volatile memory, magnetic media, and/or the like. In various embodiments Document Storage 120 includes a file server and/or random access memory, configured to be accessed via a network. Part of Document Storage 120 is optionally directly accessible to Processor 110. Document Storage 120 is typically used to store a current version of a document and/or a historical version of a document. A historical version of a document is a past version of a document or a substantial part thereof. For example, a historical version may include a copy of the state of a document prior to modification that resulted in a current version.

In some embodiments, Document Storage 120 is configured to store multiple versions of the document.

A historical version may be associated with a version marker, a date (and time), a specific modification, and/or a modification index. A version marker is a reference, such as a pointer or index, to a specific version of a document. A version marker may be manually designated by a user (e.g., by entering a "save as new version" command) or automatically as the result of some event, e.g., checking a document into Document Editing System 100. An associated date is typically the date/time on which the historical version was a current version of the document.

Document Editing System 100 further includes Document Editing Logic 130 configured for a user to modify and/or otherwise manipulate a document. Document Editing Logic 130 is optionally configured for a plurality of users to modify a document at the same time without locking of the document. Document Editing Logic 130 optionally includes the systems and methods disclosed in U.S. patent application Ser. No. 12/431,627 filed Apr. 28, 2009 and entitled "Realtime Synchronized Document Editing by Multiple Users."

Document Editing System 100 further includes a Revision History Storage 140 configured to store a revision history of a document. The revision history includes a record of modifications made to the document and optionally further includes information such as when a document was checked in or out, who made modifications, changes in ownership of a document, a record of when historical versions of a document were produced or discarded, locations of historical versions, version markers, and the like. In various embodiments, Revision History Storage 140 includes a hard drive, optical storage media, random access memory, flash memory, static memory, volatile memory, magnetic media, and/or the like. Revision History Storage 140 optionally includes a file server and/or random access memory, configured to be accessed via a network. Revision History Storage 140 is optionally combined with part of Document Storage 120.

Document Editing System 100 further includes Display Logic 150 configured to display a user interface including a document and a timeslider. Display Logic 150 includes hardware, firmware and/or software stored on a non-transitory computer readable medium. In some embodiments, Display Logic 150 is configured to generate images and/or computing instructions of the user interface for communication over a network and display on a remote device of a user. In some embodiments, Display Logic 150 is configured to display the user interface on a device local to Display Logic 150. Display Logic 150 is optionally configured to generate instructions, e.g., Java, HTML or XML, for display of the user interface in a browser. The user interface includes elements configured to edit a document as well as manipulate the timeslider. The user interface optionally also includes inputs configured for a user to compare documents, establish a time marker, create historical versions, remove historical versions, condense a document history, pass ownership of the document, and/or the like.

Document Editing System 100 optionally further includes Conflict Resolution Logic 160 configured to manage and merge changes to a document received from different sources. The timeslider is optionally responsive to events that occur within Conflict Resolution Logic 160. For example, if a document is checked out by a user, a master copy and a checked out copy of the document exist at the same time. If changes are made to both the master copy and the checked out copy of the document before the checked out copy is checked back in, then there may be conflicting modifications to the two copies. Conflict Resolution Logic 160 is configured to identify these conflicts and resolve them. The resolution may be automatic or may include presenting each conflict to a user and requesting which of the conflicting modifications should be allowed and discarded. The user to whom each conflict is presented is optionally the owner of the document. In some embodiments, conflicting modifications are automatically resolved based on a hierarchy of users. An owner of a document is a user that has privileges greater than other user/editors of the document. For example, an owner can grant or revoke privileges of other user/editors. An owner may require that modification to a document receive his or her approval before they are accepted.

In some embodiments, the owner of the document can accept or reject modifications on a per author basis. In some embodiments, when the owner rejects modifications by a particular author, the modifications by the particular author are removed or deleted from the document.

Optional Version Management Logic 170 is configured to manage different historical versions of a document. Version Management Logic 170 may be configured to automatically review a document when the document is checked in to identify changes that occurred in the document while it was checked out, and to store these changes in a revision history. Version Management is optionally configured to automatically establish version markers when a document is checked in or out.

In various embodiments Version Management Logic 170 includes logic configured for deleting, storing and/or retrieving historical versions, for comparing historical versions, for comparing a current version with a historical version, for rolling back or forward modifications to a document, to managing checking in and out of documents, for associating a version marker with a particular version, and/or the like. For example, Version Management Logic 170 may be configured to present a time-line of versions to a user and include logic configured for deleting or creating historical version. Version Management Logic 170 is optionally further configured for navigating a revision history to different states of a document. For example, creating a historical version may include navigating a revision history of the document to a particular document state and then saving the document, in that particular state, in Document Storage 120 as a historical version. Alternatively creating a historical version may include saving a current version in Document Storage 120 and then making further modifications to the current version, while keeping the saved version static as a historical version.

In some embodiments, Version Management Logic 170 is configured to include modifications to the document that occur while the document is checked out from Document Editing System 100, in the revision history.

Versions of a document are optionally compared using "redline" or similar markings. For example, the differences between two versions may be presented to a user as a single document including underlined additions and deletions struck out. The comparison may be produced by comparing a historical version with another version directly. Alternatively, the comparison may be produced by navigating the revision history from one version to the other and applying modifications in the navigated history with marking (track changes) on. In this case, information included in the revision history may be included in the comparison. For example, the identity of users who made modifications, modification dates, a modification order, or the like, may be included in the comparison provided to a user. This type of information is not available when two static documents are compared. Version Management Logic 170 is optionally configured to filter modifications shown in a comparison based on, for example, the identity of a user. As such, modifications made by just one or more specific user may be marked while other modifications are unmarked. Comparisons may be made forward or backward in time.

Computing systems and logic referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a non-transitory computer-readable medium, or combinations thereof. A non-transitory computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

Figure 1B:
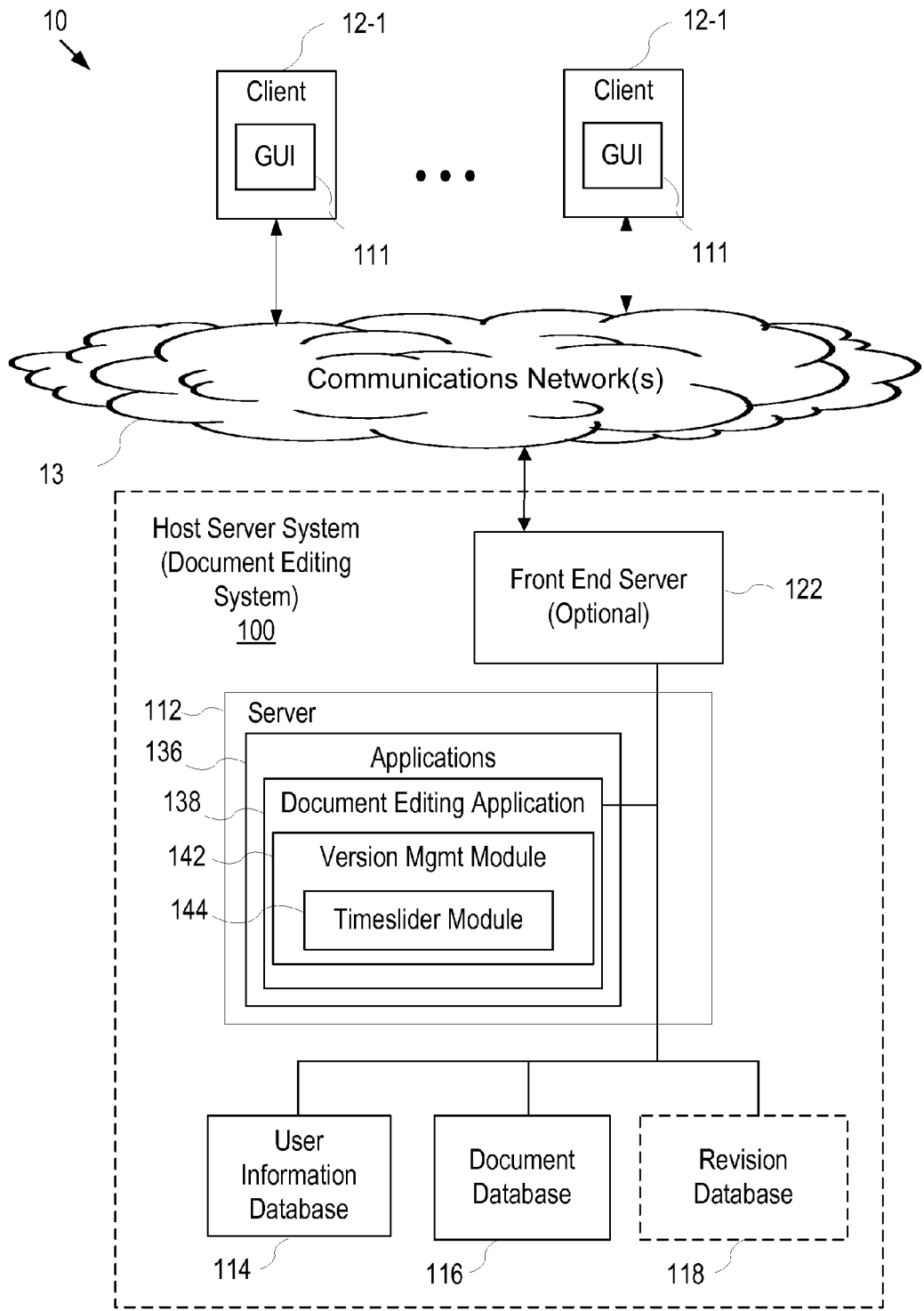
FIG. 1B is a block diagram illustrating an exemplary distributed computer system in accordance with some embodiments.

FIG. 1B is a block diagram illustrating an exemplary distributed computer system 10, according to certain embodiments. In FIG. 1, system 10 includes one or more client computers 12, communications network(s) 13, and host server system 100 (also called a document editing system). System 10 typically includes two or more client computers 12. Various embodiments of host server system 100 implement the document editing system described in this document.

Client computers 12 can be any of a number of computing devices (e.g., Internet kiosk, personal digital assistant, cell phone, gaming device, desktop computer, laptop computer, handheld computer, or combinations thereof) used to enable the activities described below. Client computer(s) 12 is also referred to herein as client(s). Client 12 includes graphical user interface (GUI) 111. Client 12 is described in greater detail below with reference to FIG. 1D. Client 12 is connected to host server system 100 via communications network 13. As described in more detail below, the GUI 111 is used to display a document or a portion of the document. Host server system 100 provides document management services to a community of users (e.g., employees of a company, members of an organization or group, visitors to a web log (also called a blog), etc.) who access documents from clients 12.

Host server system 100 includes one or more servers, such as server 112, connected to communications network 13. Optionally, the one or more servers are connected to communications network 13 via front end server 122 (e.g., a server that conveys (and optionally parses) inbound requests to the appropriate server of the host server system 100, and that formats responses and/or other information being sent to clients in response to requests). Front end server 122, if present, may be a web server providing web based access to host server system 100. Front end server 122, if present, may also route communications to and from other destinations, such as an authorization system (not shown).

Host server system 100 includes user information database 114, document database 116 (e.g., document storage 120, FIG. 1), and optionally revision database 118 (e.g., revision history storage 140, FIG. 1). In some embodiments, host server system 100 also includes or has access to one or more other databases. Server 112 includes applications 136, including document editing application 138. Document editing application 138 includes version management module 142, and/or timeslider module 144. Server 112 communicates with databases internal to the host server system 100, such as user information database 114, document database 116, and optional revision database 118 using a local area network, by internal communication busses, or by any other appropriate mechanism or combination of mechanism.

Server 112 communicates with clients 12 via the front end server 122 (if present) and communication network(s) 13. In some embodiments, the communications network 13 is the Internet. In other embodiments, the communication network 13 can be any local area network (LAN), wide area network (WAN), metropolitan area network, or a combination of such networks. In some embodiments, server 112 is a web server that manages documents using appropriate communication protocols. Alternatively, if server 112 is used within an intranet, it may be an intranet server.

Applications 136 include application programs running on the server 112 including document editing application 138, which is used for providing online document editing services. In some embodiments, applications 136 also include a user information processing module (not shown), and the user information processing module assists in accessing and updating user information database 114. User information database 114 stores various information associated with the users of the host server system 100, including user preferences, editing rights, authentication information, etc.

Version management module 142 creates, retrieves, updates, and/or deletes one or more versions of a respective document. In some embodiments, one or more versions of the respective document are stored in document database 116. In some embodiments, the one or more versions of the respective document are stored in revision database 118, if present.

In some embodiments, Version Management Module 142 includes Timeslider Module 144. The Timeslider Module is configured to receive information representing a user input (e.g., manipulation of a timeslider control element), and identifying a corresponding version of the document. Version Management Module 142 is configured to retrieve the version identified by the Timeslider Module 144. Alternatively, Timeslider Module 144 is included in Document Editing Application 138, but not part of Version Management Module 142.

Document database 116 stores various information associated with documents stored in host server system 100 (e.g., document ID, content, editing rights, revision history, etc.). Alternatively, at least a subset of the information is stored in the revision database 118.

Optionally, host server system 100 includes revision database 118. Revision database 118 may include revisions/modifications to a document. In some embodiments, revision database 118 includes a plurality of versions of a respective document (e.g., versions before and after editing in accordance with user inputs). In some embodiments, revision database 118 includes three or more versions of a respective document (e.g., six versions as represented by version markers 240 in FIG. 3). In some embodiments, revision database 118 includes revision history for one or more documents. In some embodiments, revision database 118 is included in document database 116.

Server 112 is configured to manage certain aspects of host server system 100 (document editing system), including receiving version selection information (e.g., using a timeslider control element) from a client 12, and transmitting a corresponding version to the same client 12.

Optionally, the host server system 100 is implemented as part of a general document editing system that provides document editing service for general purposes. Alternatively, the host server system 100 can be implemented as a collaborative document editing system that provides collaborative document editing services (e.g., services that enable simultaneous editing of the same document by multiple users and/or authors).

In some embodiments, fewer and/or additional modules, functions or databases are included in host server system 100 and server 112. The modules shown in host server system 100 and server 112 represent functions performed in certain embodiments.

Figure 1C:
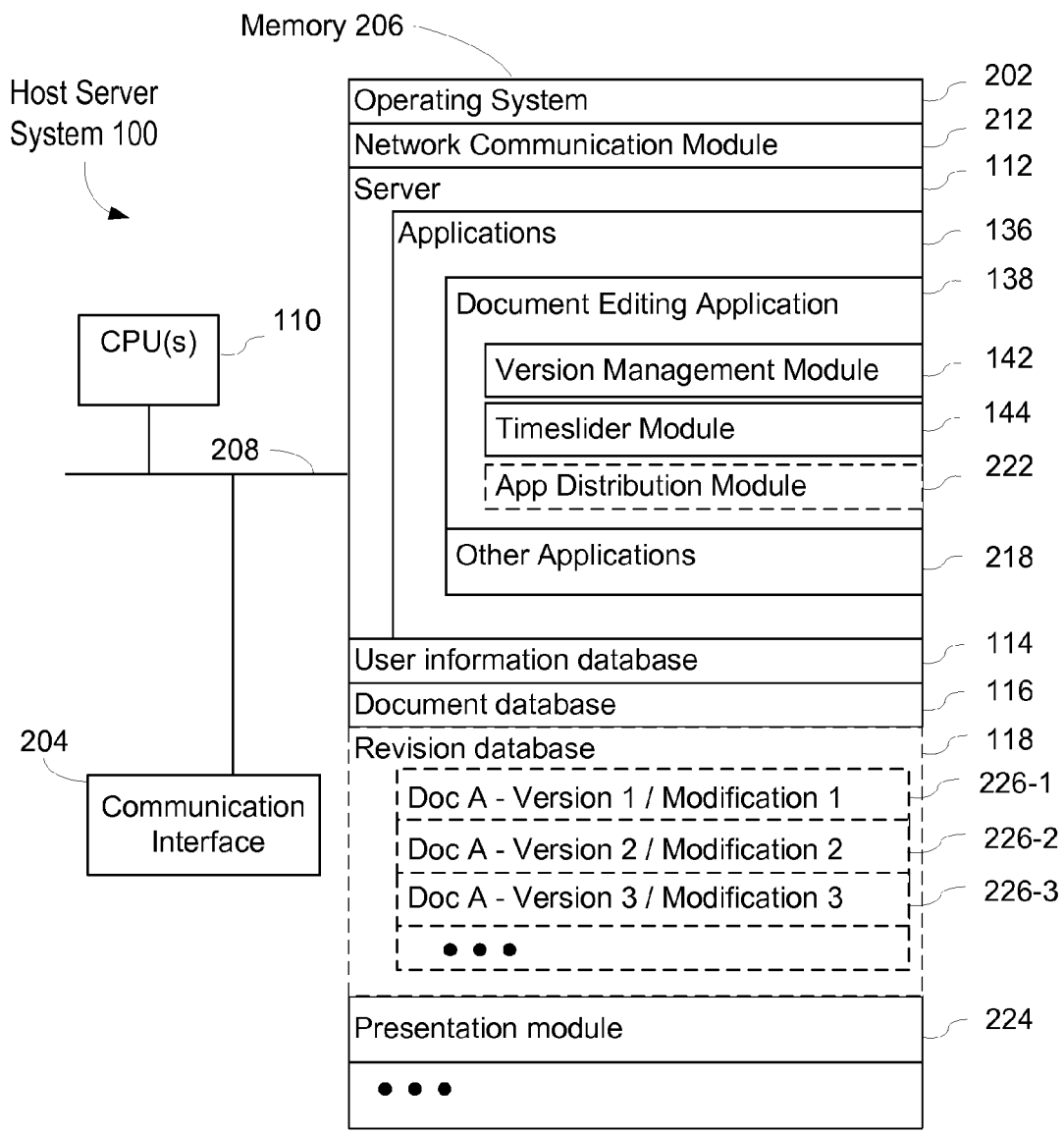
FIG. 1C is a block diagram illustrating a document editing system in accordance with some embodiments.

FIG. 1C is a block diagram illustrating host server system 100, also called a document editing system in accordance with some embodiments. Host server system 100 typically includes one or more processing units (CPUs) 110, one or more network or other communications interfaces 204, memory 206, and one or more communication buses 208 for interconnecting these components. In some embodiments, communication buses 208 include circuitry (sometimes called a chipset) that interconnects and controls communications between system components. In some other embodiments, host server system 100 includes a user interface (not shown) (e.g., a user interface having a display device, a keyboard, and a mouse or other pointing device), but more typically host server system 100 is controlled from and accessed by various client systems (e.g., 12).

Memory 206 of host server system 100 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 110. Memory 206, or alternately the non-volatile memory device(s) within memory 206, comprises a computer readable storage medium. The computer readable storage medium is a non-transitory computer readable storage medium for storing information. In some embodiments, memory 206 or the non-transitory computer readable storage medium of memory 206 stores the following programs, modules and data structures, or a subset thereof:

- Operating System 202 that includes procedures for handling various basic system services and for performing hardware dependent tasks;
- Network Communication Module (or instructions) 212 that is used for connecting host server system 100 to other computers (e.g., clients 12) via the one or more network interfaces 204 and one or more communications networks 13 (FIG. 1B), such as the Internet, other wide area networks, local area networks, metropolitan area networks, and so on;
- Server 112 for managing certain aspects of the host server system 100, including document editing services; and
- Presentation module 224 that formats results from server 112 (e.g., document editing application 138) for display at respective clients; for example, presentation module 224 may generate a web page or XML document that includes content of a respective document; in some embodiments presentation module 224 is executed by the front end server 122, which comprises one of the servers implementing the Document Editing System 100; optionally the presentation module 220 is a module of Document Editing Application 138.

In some embodiments, server 112 includes the following programs, modules and data structures, or a subset or superset thereof:

Applications 136, including Document Editing Application 138 for performing the primary functions of a document editing system; applications 136 may optionally include other applications 218;

User information database 114 that stores user information;

Document database 116 that stores documents as well as information (e.g., metadata) concerning the stored documents (e.g., document title, document type, creation date, first author, last update timestamp, location, etc.); and Optional revision database 118 that stores revision information concerning documents stored in document database 116 (e.g., modifications/revisions, timestamps, editors, editing-rights, editing-right-controls, etc.); otherwise, information concerning editing-rights and editing-right-controls can be stored in user database 114 and/or document database 116.

In some embodiments, Revision Database 118 includes a plurality of versions of a respective document (e.g., 226-1, 226-2, and 226-3). In some embodiments, Revision Database 118 includes multiple sets of modifications and/or revisions of a document, and one or more versions of the respective document can be generated in accordance with the modification/revision information 226 and information stored in the document database 116 (e.g., the initial version of the document). In some embodiments, a respective set of modifications is called a Changeset, as described in U.S. patent application Ser. No. 12/431,627, filed Apr. 28, 2009, entitled "Realtime Synchronized Document Editing by Multiple Users," which is incorporated herein by reference in its entirety.

Document Editing Application 138 typically processes document-related requests and inputs from and provides responses to clients 12. Document Editing Application 138 includes a client-interface module (not shown), which assists in receiving requests and inputs from and sending information to clients 12. In some embodiments, Document Editing Application 138 includes the following, a subset, or a superset thereof:

Version Management Module 142 that creates, retrieves, updates, and/or deletes one or more versions of a respective document stored in Document Database 116 or Revision Database 118 in accordance with inputs from clients 12 via communication interface 204 and/or network communication module 212;

Timeslider Module 144 that receives information representing a user input (e.g., manipulation of a timeslider control element), and identifying a corresponding document version in accordance with the user input; and (optional) Application Distribution Module 222.

Application distribution module 222, if present, distributes to clients 12 a set of instructions for displaying a document and a timeslider control element, receiving inputs from users, and/or updating the document, etc. In some embodiments, the set of instructions is distributed as a web application. In some embodiments, the set of instructions is distributed as an embedded application (which may be based on Java script, Java applet, Ajax, Comet, Active X, or any other programming languages and tool) in a web page (e.g., document editing module 319 in webpage 318 in FIG. 1D). In some embodiments, the set of instructions are distributed as an add-on, plug-in, and/or toolbar for respective browser applications (e.g., 314 in FIG. 1D) in clients 12.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Notwithstanding the discrete blocks in FIGS. 1B and 1C, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, document database 116 is part of or stored within server 112. In other embodiments, document database 116 is implemented using one or more servers whose primary function is to store and process document information. In some embodiments, document database 116 includes revision database 118, or vice versa. In some embodiments, document database 116 includes user database 114, or vice versa. In some embodiments, a remote database server includes user database 114, document database 116, and/or revision database 118, at a different physical location from server 112. User database 114, document database 116, and/or revision database 118 can be implemented on one or more servers.

The actual number of servers used to implement a host server system 100 and how features are allocated among them will vary from one implementation to another, and may depend in part on the amount of data traffic that the system must handle during peak usage periods as well as during average usage periods, and may also depend on the amount of data stored by the document editing system. Moreover, one or more of the blocks in Figure 1B may be implemented on one or more servers designed to provide the described functionality. Although the description herein refers to certain features implemented in client 12 and certain features implemented in server 112, the embodiments are not limited to such distinctions. For example, at least some of the features described herein as being part of server 112 can be implemented in whole or in part in client 12, and vice versa.

Figure 1D:
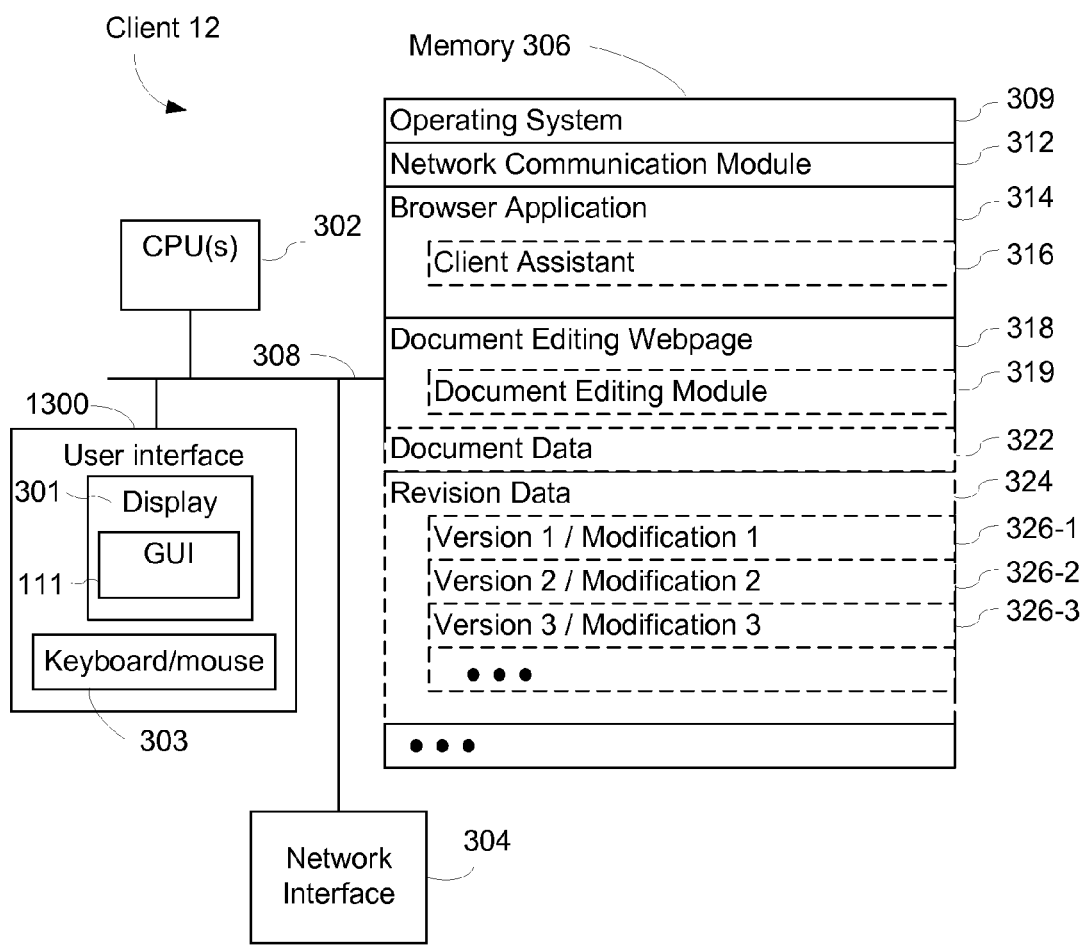
FIG. 1D is a block diagram illustrating a client in accordance with some embodiments.

FIG. 1D is a block diagram illustrating a client, also called client systems or client devices in accordance with some embodiments. Client 12 includes a user interface 1300, which typically includes a display device 301, and one or more input devices 303 such as a keyboard and a mouse or other pointing device. As noted above, client 12 includes a graphical user interface (GUI) 111, which is displayed on the display device 301. Client 12 typically includes one or more processing units (CPUs) 302, one or more network or other network communications interfaces 304, memory 306, and one or more communication buses 308 for interconnecting these components. In some embodiments, communication buses 308 includes circuitry (sometimes called a chipset) that interconnects and controls communications between system components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, comprises a computer readable storage medium. The computer readable storage medium is a non-transitory computer readable storage medium for storing information. In some embodiments, memory 306 or the non-transitory computer readable storage medium of memory 306 stores the following programs, modules and data structures, or a subset thereof:

Operating System 309 that includes procedures for handling various basic system services and for performing hardware dependent tasks;

Network Communication Module (or instructions) 312 that is used for connecting client 12 to other computers (e.g., host server system 100 and other clients 12) via the one or more communications network interfaces 304 and one or more communication networks 13 (FIG. 1B), such as the Internet, other wide area networks, local area networks, metropolitan area networks, and so on;

Browser Application 314; optionally, the browser application 314 or an extension, plug-in or toolbar of the browser application includes a client assistant 316 that handles data formatting and/or management tasks in providing document editing environment, at least some of which would otherwise be handled by presentation module 224 (FIG. 1C);

Document Editing Webpage 318, which is a webpage received from host server system 100, for displaying in GUI 111 at least a portion of a document; Document Editing Webpage 318 may optionally include Document Editing Module 319, which is executable code embedded in webpage 318;

(optional) Document Data 322, which is a locally stored copy of a respective document for editing and/or display; document data 322, if stored at the client 12, optionally includes metadata concerning the document (e.g., document title, document type, creation date, first author, last update timestamp, location, editing-rights, editing-right-controls, etc.); in some embodiments, document data 322 is included in webpage 318; and (optional) Revision Data 324, which represents revisions/modifications to a document; revision data 324, if included at the client 12, typically includes a plurality of versions or different sets of modifications (e.g., 326-1, 326-2, 326-3, etc.) of the document.

In some embodiments, a respective set of modifications is called a Changeset, as explained above with respect to FIG. 1C.

In some embodiments, client 12 includes a plurality of documents. In some embodiments, client 12 includes a plurality of document editing webpages (e.g., Document Editing Webpage 318 includes a plurality of webpages).

In some embodiments, client 12 includes a document editing application (not shown) in addition to, or in lieu of, browser application 314 and document editing webpage 318. In such embodiment, the document editing application includes functions of Client Assistant 316 and/or Document Editing Module 319, and additional modules necessary to process inputs (e.g., from input devices 303), update document data 322 and/or revision data 324, and display document information on display 301.

In some embodiments, client 12 may be a "thin client," which includes browser application 314 that displays document editing webpage 318 received from host server system 100. In this embodiment, client 12 only displays the document editing webpage, and executes programs, if any, embedded within the document editing webpage 318, but does not include additional document editing software for editing documents stored by host server system 100. In some embodiments, programs embedded within the document editing webpage 318 format document data for display. In thin client embodiments, document-related processing other than user data input and document display are handled by host server system 100 (e.g., identifying a version of a document and retrieving a identified version of the document).

Figure 2A:
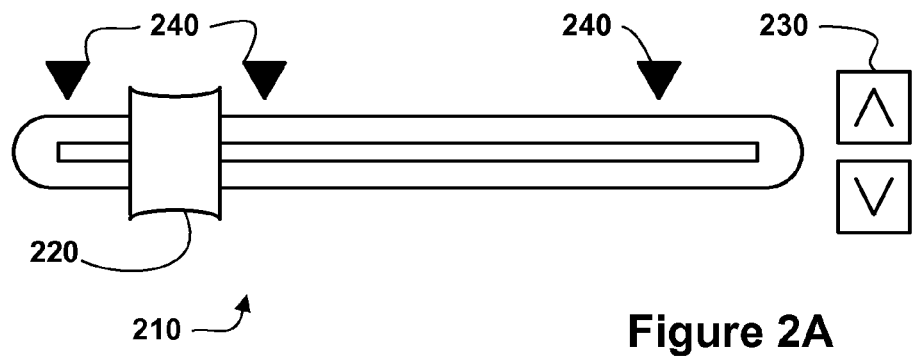
FIGS. 2A, 2B and 2C are illustrative examples of a timeslider, according to various embodiment.
Figure 2B:
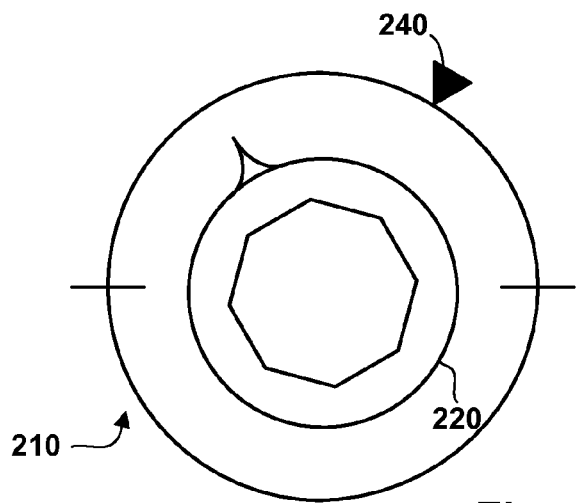
Figure 2C:
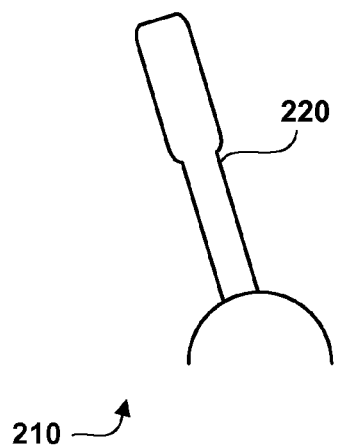

FIGS. 2A, 2B and 2C are illustrative examples of a Timeslider 210, according to various embodiments. Timeslider 210 is configured to navigate backward or forward through the revision history of a document by manipulating a Control Element 220. For example the Control Element 220 illustrated in FIG. 2A may be dragged back and forth using a mouse. The Control Elements 220 illustrated in FIGS. 2B and 2C are rotated to navigate a revision history. In a graphical user interface, movement of Timeslider 210 is typically accomplished using a pointing device such as a touch pad, track ball or a mouse. Control Element 220 can be selected using this pointing device and dragged to a new position. This movement is received as an input by Display Logic 150 and/or Version Management Logic 170.

Thus, in some embodiments, Timeslider 210 includes Control Element 220, and Timeslider 210 represents modifications to, and/or versions of, a respective document on a timeline.

While Timeslider 210 is optionally presented as an analog control to a user, movement of Timeslider 210 by a user is converted to a digital value by Display Logic 150. This value is then used to determine a number of steps in the revision history to navigate. The resolution of Timeslider 210 is the conversion ratio between the amount of movement of the Timeslider 210 and the number of steps in the revision history navigated. In some embodiments, the resolution of Timeslider 210 is changed automatically as the number of modifications in the revision history changes. For example, as more modifications are made in the document the resolution of Timeslider 210 may be automatically changed such that a full scale movement of Timeslider 210 corresponds to the full revision history of changes. In some embodiments, the resolution of Timeslider 210 is automatically changed such that the full scale movement of Timeslider 210 corresponds to navigation from a current version of a document to the nearest historical version. Once the nearest historical version is reached, Timeslider 210 may then be used to reach the next nearest historical version. In some embodiments, Document Editing Logic 130 is configured for a user to select a resolution of Timeslider 210.

In some embodiments, Timeslider 210 includes a Resolution Control 230 configured for a user to manually change the resolution of Timeslider 210 between a plurality of alternative resolutions. Resolution Control 230 may be used to zoom in and out the resolution of Timeslider 210. In some embodiments, the resolution of Timeslider 210 is non-linear. For example, the resolution may change according to a logarithmic function dependent on how far Timeslider 210 is moved at once. A different resolution is used for smaller movements of Timeslider 210 relative to larger movements of Timeslider 210. Thus, in these embodiments, a small (e.g., ¼ inch) movement of Timeslider 210 may be used to step single steps through a revision history while a large (e.g., 2 inch) movement may be used to navigate large distances (e.g. greater than 10 steps) through the revision history.

Timeslider 210 optionally includes one or more Version Markers 240 disposed to indicate to a user the presence of historical versions within the revision history represented by Timeslider 210. For example, FIG. 2A illustrates three instances of Version Markers 240 disposed at different positions along Timeslider 210. Each of these Version Markers 240 is associated with a particular point in the revision history of a document. They are, thus, associated with a particular state or version of the document. For example, a Version Marker 240 may include a pointer or an index to a particular modification. Version Markers 240 may or not be associated with a historical version of the document.

In some embodiments, Version Markers 240 are generated by a user. In other words, in some embodiments, Version Markers 240 are generated in accordance with user inputs. For example, a user may right click on a point within Timeslider 210 to bring up a menu configured to designate a Version Marker 240 at the clicked point. Alternatively, a user may request that a Version Marker 240 be established at a historical version or a current version of a document. In some cases, Version Markers 240 are automatically generated when a document is checked in, checked out, printed, opened for editing, saved, copied, and/or document ownership is changed.

Thus, in some embodiments, Document Editing System 100 (or Display Logic 150 in Document Editing System 100) is configured for a user to set one or more version markers, and Timeslider 210 is configured for navigating among the version markers.

In some embodiments, Document Editing System 100 automatically creates a version marker when a predefined condition is satisfied. The predefined condition includes one or more of: when a document is checked in, checked out, printed, opened for editing, saved, copied, and document ownership is changed.

In typical embodiments a user can select (e.g., click on) a Version Marker 240 to jump to the associated version or state of a document. If the version marker is associated with a historically version, the associated historical version is retrieved from Document Storage 120 and optionally displayed to the user. If the Version Marker 240 is not associated with a historical version, then Version Management Logic 170 is used to navigate the revision history to the particular state of the document associated with the Version Marker 240. This navigation may begin at a (historical or current) version before or after the version marker.

For example, in some embodiments, the timeslider includes a first version marker corresponding to the first version and a second version marker corresponding to the second version, and the movement of the control element is in accordance with a selection of a version marker by the user.

Version Markers 240 may also be used as a handle to identify a particular state of a document for further processing. For example, two version markers may be selected for comparison of the versions of a document associated with each version marker. Likewise, in some embodiments, a Version Marker 240 may be selected in order to generate a historical version representing the state of the document associated with the Version Marker 240. For example, when a user selects a Version Marker 240 it may be first determined if the Version Marker 240 is associated with a historical version stored in Document Storage 120. If not, then the revision history is navigated (forward and/or backward in time) from the modification referenced by the Version Marker 240 until a current or historical version is found. This version and the modifications navigated are then used to create a version of the document that can be stored as an historical version associated with the Version Marker 240.

A historical version may be generated with or without the use of a Version Marker 240. For example, various embodiments include a method of creating a historical version of a document, this method includes receiving an input from a timeslider at Version Management logic 170. This input may be the selection or designation of a Version Marker 240 or may be a result of a movement of Control Element 220 to a particular position. For example, the input may include the position of Control Element 220. The input optionally includes a specific instruction to create a historical version of the document. The input is optionally received over a computer network and/or using Display Logic 150. In some embodiments, the input is received from a browser. The input optionally includes instructions configured to direct Version Management Logic 170 to store the historical version in a particular location. The input includes information configured for identifying a specific point in a revision history, e.g., identifying a specific modification in a document.

Thus, in some embodiments, the movement of Control Element 220 is in accordance with a selection of a position on Timeslider 210 by a user.

In another step of the method, the input is used to identify a specific modification within the revision history of the document. For example, in some embodiments, the input is used to generate a pointer or an index that is then used to access a specific modification.

In another step of the method, a version of the document before or after the identified modification is identified. In some embodiments this is accomplished by simply selecting the current version by default. In other embodiments, the revision history is navigated forward or backward until a historical or current version associated with a modification is found. Regardless of how the version of the document is identified, the method includes navigation between the identified version and the identified modification. This navigation may be in either direction and includes retrieving each of modifications between these two points of the revision history. The retrieved modifications are applied to the identified version to produce a version of the document that reflects the state of the document at the time (immediately before or after) the time the identified modification was first made. The application of the retrieved modifications starts with the identified version and the modifications are applied to this version is the same order they were originally made or the reverse of that order depending on whether the identified version is before or after the identified modification in the revision history. For example, if the identified version is the current version and the navigation is back in time along the revision history, then the modifications are applied (by reversing the effect of the modification) in the reverse of the order in which they were originally applied. The result of applying the modifications is to produce a version of the document at (e.g., immediately before or after) the time of the identified modification. As a last step in the method the produced version of the document is saved in Document Storage 120 as a historical version. A mark, such as a Version Marker 240, is optionally displayed on Timeslider 210 to indicate presence of this historical version.

As explained above, in some implementations or in some particular situations, a movement of Control Element 220 results in a display of a version other than a (immediately) next version or a (immediately) previous version. When the document has three or more sequential versions, a first displayed version and a subsequently displayed version need not be consecutive versions, depending on the scaling and amount of movement of Control Element 220. Stated differently, the document has at least one version between the first displayed version and the subsequently displayed version.

Figure 3:
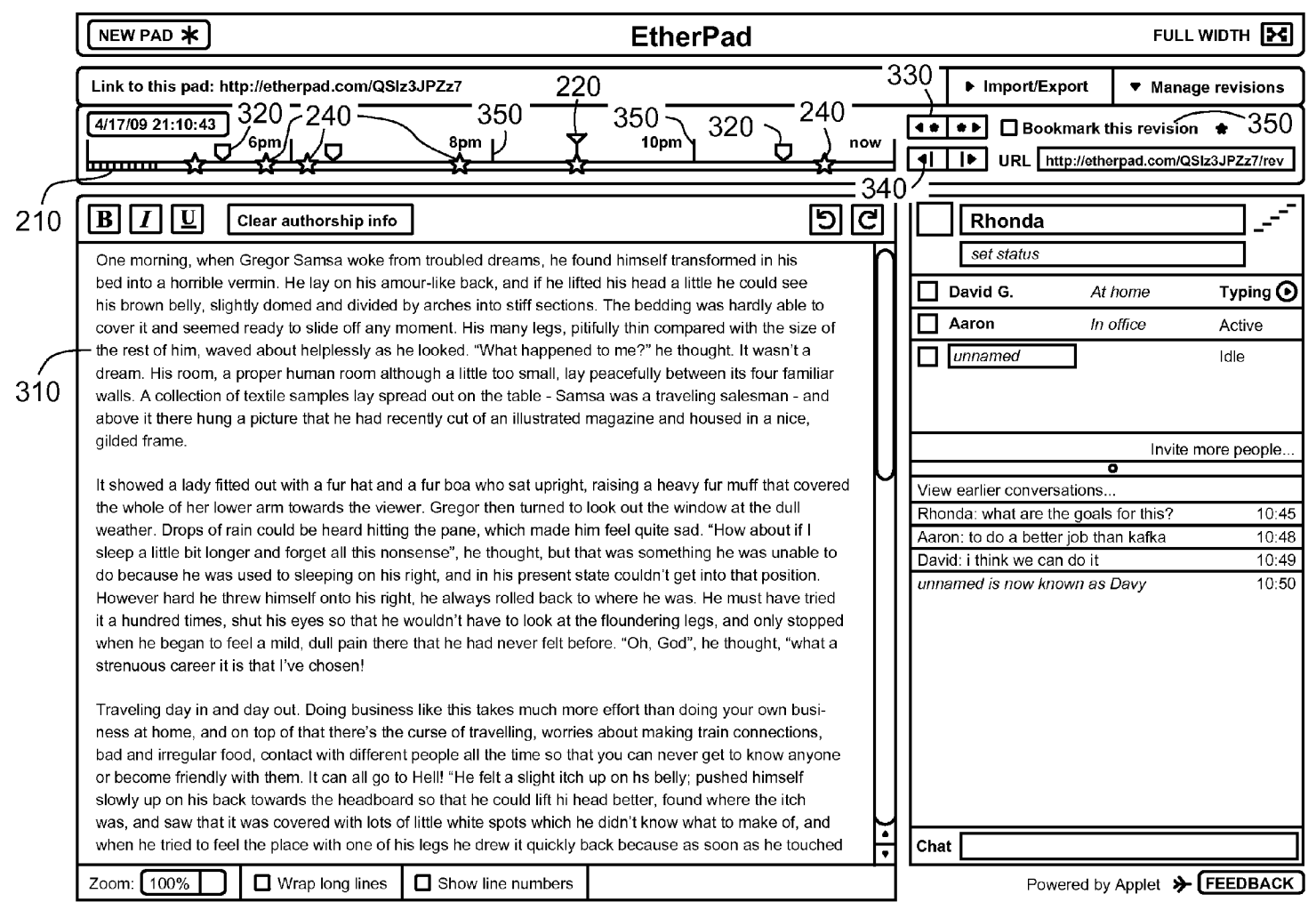

FIG. 3 is an example of a timeslider displayed in a Document Editing Interface 310 in accordance with some embodiments. Document Editing Interface 310 is optionally displayed in a browser and includes an area where text is displayed and may be edited simultaneously by multiple users. Document Editing Interface 310 also includes a Timeslider 210 having a Control Element 220. Display Logic 150 is typically configured such that the version of the text displayed in the text area corresponds to the version indicated by the position of the Control Element 220 within Timeslider 210.

A plurality of Version Markers 240 are shown on Timeslider 210. Two types of Version Markers 240 are shown. Those shown as stars are each a bookmark to a particular version and those shown as tabs are Historical Version Markers 320 that indicate that a historical version of the document has been saved at a particular time, e.g. at a particular modification. Clicking on either type of Version Marker 240 will optionally cause movement of Control Element 220 and the associated version of the document to be displayed in the text area. Document Editing Interface 310 further includes a plurality of Version Controls 330. Display Logic 150 is configured such that clicking on one of Version Controls 330 will result in Control Element 220 jumping forward or backward to the next Version Marker 240. As with clicking on a Version Marker 240, jumping to a Version Marker 240 will cause the associated version of the document to be displayed in the text area. Document Editing Interface 310 further includes a plurality of Navigation Controls 340. Display Logic 150 is configured such that clicking on Navigation Controls 340 will cause the Control Element 220 to jump to the very beginning or the very end of Timeslider 210 and display the associated version of the document.

The Timeslider 210 illustrated in FIG. 3 further includes a plurality of Time Markers 350 configured to indicate the time a modification was made. The scale at which Time Markers 350 are displayed may be linear in time or linear in the number of modifications made. In some embodiments, Timeslider 210 includes markers indicating a number of modifications.

Figure 4A:
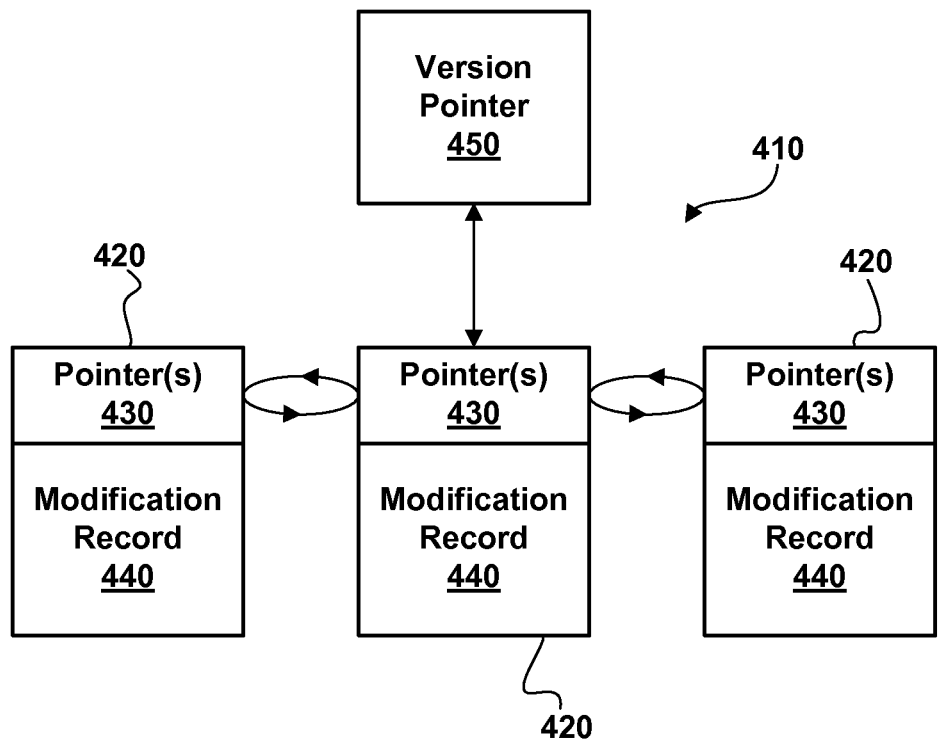
FIGS. 4A, 4B and 4C are examples of a data structure that may be used to store a revision history in accordance with some embodiments.

FIG. 4A is an example of a Data Structure 410 that may be used to store a revision history in Revision History Storage 140 in accordance with some embodiments. Data Structure 410 includes a plurality of Records 420 linked by one or more Pointers 430. Pointers 430 are configured to navigate between Records 420. Each of Records 420 includes a Modification Record 440 including information regarding a modification to a document. Data Structure 410 optionally further includes a Version Pointer 450 configured to point to a specific Modification Record 440. Optionally, Version Pointer 450 includes an index of Modification Record 440 or a pointer to a memory location at which the associated Modification Record 440 is stored. Version Pointer 450 is optionally part of a Version Marker 240.

Figure 4B:
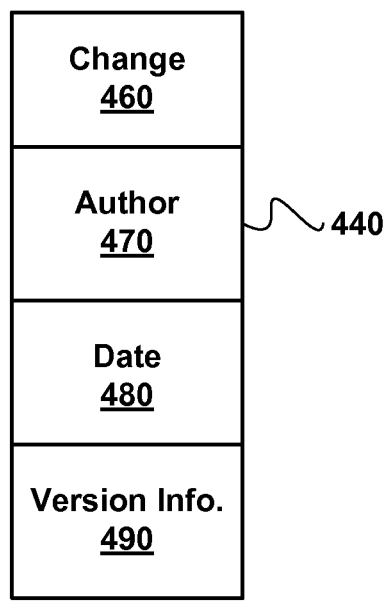

In various embodiments, Modification Record 440 may include a wide variety of information. One example of a Modification Record 440 is illustrated in FIG. 4B. This example includes a Change Field 460, an optional Author Field 470 and an optional Date Field 480. Change Field 460 is configured to store information regarding a specific modification. For example, Change Field 460 may include a location within the document and may include the addition or deletion of a single character, a modification in font or other aspect of a character, a modification in a paragraph or other multi-character characteristic, a modification in a group of characters, modification(s) made by during a set time period, and/or the like. In some embodiments, Document Editing Logic 130 is configured for a user to select the size(s) of each modification stored in Change Field 460. For example, a user may select that the resolution for storage of the revision history in Revision History Storage 140 be on a character of keystroke basis, word basis, a sentence basis, or a paragraph basis. In some embodiments, such resolution for storage defines whether Change Field 460 stores a respective word, a respective sentence, or a respective paragraph. The resolution of storage in the revision history (also herein called a granularity of the revision history storage) is optionally a function of a communication speed over a network between Document Editing System 100 and a client (e.g., slow communication speeds corresponding to larger granularity, such as sentence granularity, while fast communication speeds corresponding to smaller granularity, such as word or keystroke granularity). Modifications are typically added to the revision history in real-time as the changes are communicated from the client to Document Editing System 100.

Author Field 470 includes information regarding the identity of a user who made the modification stored in Change Field 460. This information optionally includes a user name, user identifier (e.g., an identity number or other identifier other than a user name), or other handle.

Author Field 470 enables operations with respect to particular authors/users. For example, in some embodiments, Document Editing Logic 130 is configured to accept or reject modifications on a per-author basis (e.g., a document owner may reject all modifications made by a particular user/author) in accordance with commands or other user inputs received from an owner of the document. In some embodiments, Document Editing Logic 130 is configured to navigate the revision history on a per-author basis (e.g., a document owner may review modifications made only by a particular user/author) in accordance with commands or other user inputs received from a user at a client.

Date Field 480 includes date and time information regarding when a modification was made and/or a modification index.

Optionally, Modification Record 440 includes additional information such as one or more of the following: an approval flag used to indicate that a change has been approved by a document owner, a conflict field identifying another modification with which there is a conflict, geographical location of an author, the date of an offline change, an author or client identifier, and/or a document source. For example, if a block of text is copied from one document to another document, Modification Record 440 optionally includes an identifier of the source document.

Figure 4C:
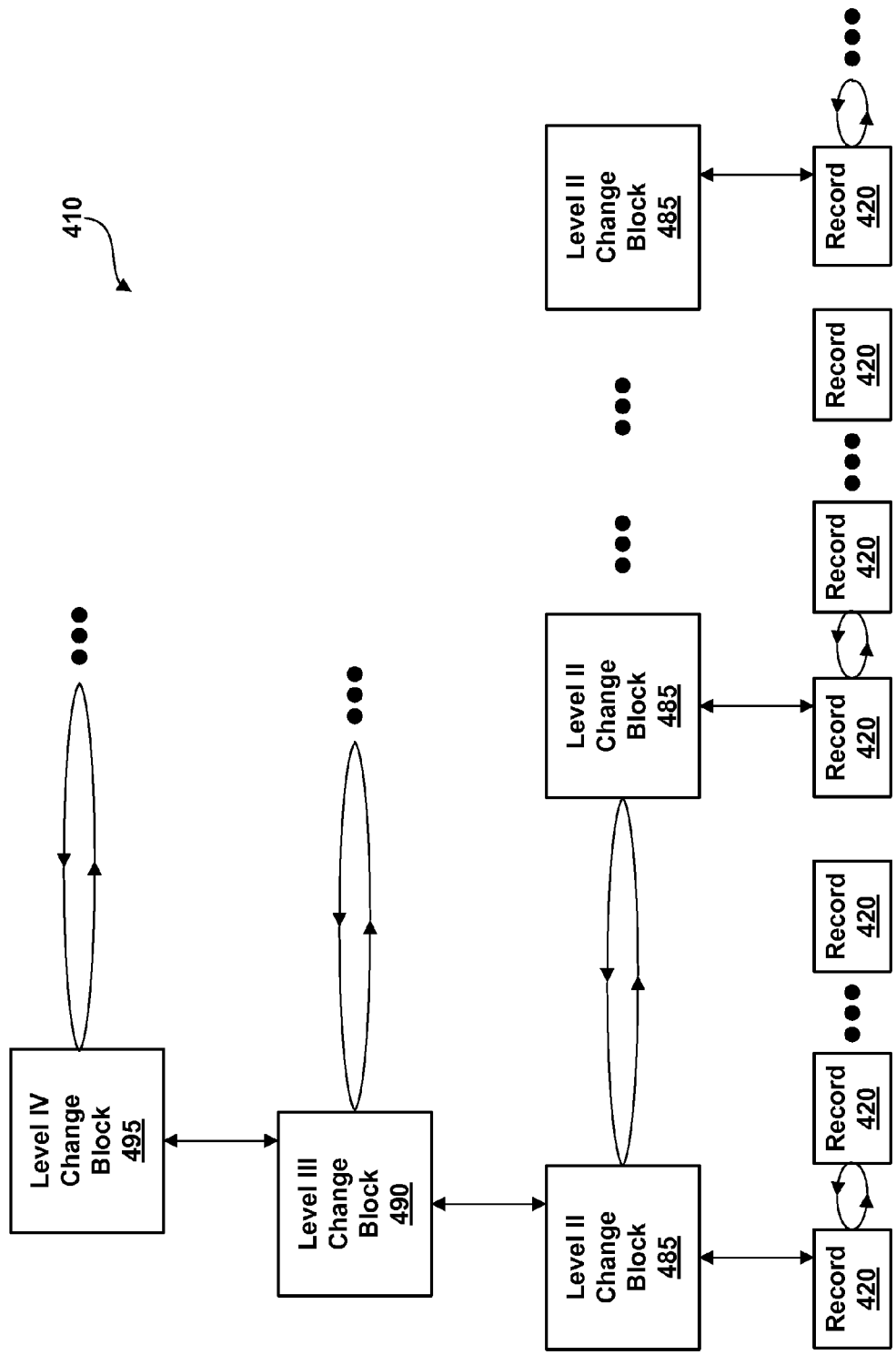

FIG. 4C is another example of Data Structure 410. This example includes a hierarchical set of data records that is optionally represented as a tree data structure. At the lowest level are individual modifications, e.g., individual keystrokes or sets of keystrokes. A document's history can easily include tens or hundreds of thousands of individual modifications. This large number of modifications can complicate the process of jumping from one version of a document to a distant version of the same document. For example, when a document has 10, 20, 30 or 50 thousand individual modifications between the versions, and navigating the tens of thousands of records in a linked list so as to transition from one version to another can result in an undesirable delay. This is particularly true when a document is presented on a remote client.

The hierarchical example of Data Structure 410 illustrated in FIG. 4C includes one or more Level II Change Block 485, one or more Level II Change Block 490 and one or more Level IV Change Block 490. These blocks are optionally represented as linked lists. Level II Change Blocks are associated with a set of Record 420 at the lowest level of Data Structure 410 using, for example, pointers. Level II change blocks each include a summation of all the modifications represented by the associated set of Record 420. For example, in some embodiments a Level II Change Block 485 is associated with ten Record 420. While the ten Record 420 may represent ten individual keystrokes (modifications) that occur within a document, the information stored in Level II Change Block 485 represent these ten individual keystrokes as a single modification. Level II Change Blocks 485 are linked by, for example, pointers. Navigation between versions of a document can be accomplished by navigating individual Record 420 or alternatively navigating between Level II Change Blocks 485. Navigation of Level II Change Blocks 485 can be much faster than navigating individual records.

The example of Data Structure 410 illustrated in FIG. 4C optionally includes additional levels of change blocks, such as Level III Change Blocks 490 and Level IV Change Blocks 495. Each of these change blocks is linked to a set of change blocks at a lower level and each includes a summation of modifications of the lower level set of change blocks. For example, a single Level II Change Block 485 may include a summation of the modifications represented by ten Record 420, a single Level III Change Block 490 may include a summation of the modifications represented by ten Level II Change Blocks 485, and a single Level IV Change Block 495 may include a summation of the modifications represented by ten Level III Change Blocks 485. Data Structure 410 optionally includes more than four levels of change blocks and records. In alternative embodiments, each change block represents less than or more than ten change blocks or Record 420 at the next lower level.

Navigation between versions of a document optionally includes navigating at the highest available change block level, then navigating at one or more lower level of change block, and if needed, navigating at the level of individual Record 420. In this approach a large number of individual modifications can be navigated more quickly than could be done navigating individual Record 420. Such navigation can efficiently handle thousands of individual modifications when navigating between document versions or otherwise navigating through a document's revision history.

In some embodiments, Display Logic 150 is configured such that movement of a timeslider results in identification of a particular Level III Change Block 490. The resolution of the timeslider is then zoomed in such that the next movement results in identification of a particular Level II Change Block 490. Finally, the resolution of the timeslider is then zoomed in again such that the next movement results in identification of a particular Record 420. This approach can start or end at any level of change block. The use of change blocks, such as Level II Change Block 485 and Level III Change Block 490 are optionally used in the methods discussed elsewhere herein to navigate the revision history of a document.

Modification Records 440 are optionally stored in other types of data structures. For example, in some embodiments they are stored in an ordered table. In these embodiments, Modification Records 420 optionally include an index field configured for finding and/or manipulating a specific Modification Record 420.

In some embodiments, the revision history (or Revision History Storage 140 in FIG. 1A or Revision Database 118 in FIG. 1C) is configured to store an ordered list of modifications that occurred between the multiple versions. In some embodiments, the document storage (e.g., 120 in FIG. 1A) is configured to store the revision history in an ordered list or a table.

Figure 5:
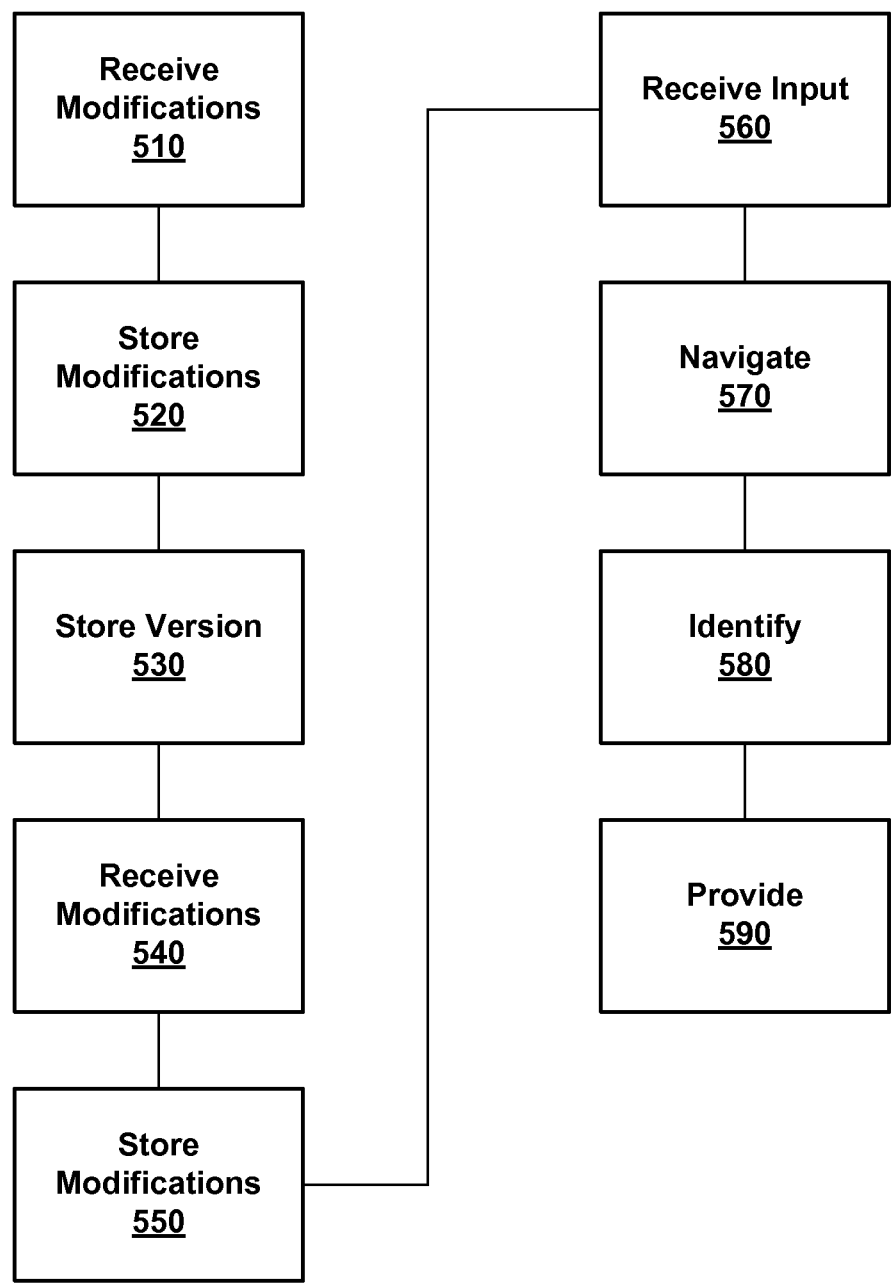
FIG. 5 is an illustration of a method of managing a document using a revision history in accordance with some embodiments.

FIG. 5 is an illustration of a method of managing a document using a revision history in accordance with some embodiments. In this method, the revision history is used to generate a version of a document as the document existed at a particular modification. In a Receive Modifications Step 510 modifications to a document are received from a user. These modifications are optionally received via a browser under the control of Display Logic 150. In some embodiments, the modifications are made in a document editing environment in which multiple users can simultaneously edit the document. In these embodiments, the modifications received in Receive Modifications Step 510 may be from a plurality of users each using a different computing device and connected using a communication network.

In some embodiments, when implemented as a client-server system, a server receives the modifications to the document from the client. When the network connection between the client and the server is down (e.g., due to traffic overflow, a failure of a network equipment, etc.), in some embodiments, the client is configured to continue to receive modifications to the document from the user of the client. In such embodiments, when the network connection is re-established between the client and the server, the client sends to the server modifications made by the user while the client was offline, and the server receives modifications made offline. In some embodiments, the server creates a version of the document in accordance with the modifications made offline.

The method of FIG. 5 is optionally performed using Display Logic 150, Version Management Logic 170 and Revision History Storage 140. Display Logic 150 and Version Management Logic 170 may be executed on Processor 110 in order to perform the method.

In a Store Modifications Step 520 the modifications received in Receive Modifications Step 510 are stored in Revision History Storage 140. The modifications are stored such that their chronological order is preserved. For example, the modifications may be added to Data Structure 410 in the order they were received. Likewise, the modifications may be added to a table in the order they were received. Each modification is stored in a Modification Record 440, which may include information such as the identity of the user that made the modification, the date/time of the modification, if the modification was associated with a conflict, if the modification was approved by a document owner, or the like.

In an optional Store Version Step 530 a current version of the document is stored in Document Storage 120. This current version is, at least in part, a result of the modifications received in Receive Modifications Step 510. The stored version is a complete version of the document, as compared to merely a set of modifications. Store Version Step 530 may occur automatically or be triggered by a command received from a user. For example, Store Version Step 530 may occur automatically when a saved document is opened for editing, checked in or out, at regular time periods, after a set number of modifications, when a new editor modifies the document, and/or the like. When a version of a document is saved, information identifying the stored version is optionally stored in a Version Information Field 490 of the most recent Modification Record 440. This information may include a pointer, a file name, a universal resource locator, and/or the like.

In Store Version Step 530 the version may be stored on a user's computing device essentially accessible only to the user, or on a server shared by multiple users. If the version is stored on a user's private computing device, then that stored version may not be available to other editors of the document. Whereas if the version is stored on a shared server, the version will typically be accessible to other editors. In some embodiments, Version Markers 240 are displayed differently so as to distinguish historical versions that are local from those that are shared. A version that is private to just one user may or may not have a corresponding Version Marker 240 displayed on another user's Timeslider 210. In some embodiments, a stored version of a document may be shared among a plurality of users, while not being accessible to other users. Access to historical document versions are optionally controlled, on a single or multiple user basis, by a document owner.

In a Receive Modifications Step 540 further modifications to the document are received from one or more users. As in Receive Modifications Step 510, these modifications may be received via a browser under the control of Display Logic 150. Once further modifications to the document are received, the version of the document stored in Store Version Step 530 becomes a historical version because it is no longer the current version.

As explained above with respect to operation 510, in a client-server system, the server may receive modifications made offline, when the network connection between the client and the server is re-established.

In a Store Modifications Step 550 the modifications received in Receive Modifications Step 540 are stored in Revision History Storage 140. These modifications are typically stored in the same Data Structure 410 as the modifications stored in Store Modifications Step 520. The modifications are stored such that their order is preserved.

In a Receive Input Step 560 an input is received by Version Management Logic 170. This input may be generated by movement of a Control Element 220, selection of a Version Marker 240, or some other user action. In general, the input received includes an identifier of at least one modification and/or version. The input may further include an operation to perform using the identified modification or version. For example, in some embodiments, the input includes an identification of a modification and an instruction to create a historical version associated with that modification. In some embodiments, the input includes the identification of a modification and instructions to provide a version of the document at that modification, e.g., for display to a user or further manipulation. In some embodiments the input includes identification of two modifications or one modification and the current version, and instructions to compare the states of the document at the identified points. Comparison instructions may be directed at any combination of document states associated with a Version Marker 240, a modification stored in Revision History Storage 140 and/or a current state. In one example, the input includes a reference to a first modification received in Receive Modifications Step 510 and a reference to a second modification received in Receive Modifications Step 540. One of these references is optionally a version marker and one of these references is optionally a numerical value corresponding to a position of Control Element 220 within Timeslider 210.

In an optional Navigate Step 570, Data Structure 410 is navigated to locate the one or more Modification Record 440 (storing a destination modification) referenced by the references received in Receive Input Step 560. This navigation may be from a current version or from a stored historical version to the destination modification. For example, in some embodiments, the linked list of Data Structure 410 is traversed from the current version to the modification associated with the received input. In some cases the navigation can be accomplished by starting at a stored historical version before or after the destination modification. The navigation can be forward or backward in time.

During Navigate Step 570 each modification traversed is optionally applied to the version of the document at which the navigation started, in a cumulative manner. As a result, when the destination modification is reached each of the modifications between the starting version and the destination modification have been applied to the starting version in their original order (or the reverse order). As a result, a state of the document at the time of the destination modification first occurred is produced.

Navigate Step 570 is optionally performed more than one time in order to navigate to more than one Modification Record 440 referenced in the received input of Receive Input Step 560. This can result in a state of the document at each of the times the destination modifications occurred.

In an optional Identify Step 580, differences between different states of the document are identified. In some embodiments, Identify Step 580 is performed by noting the modifications encountered during Navigate Step 570 and then applying those modifications. In some embodiments Identify Step 580 is performed in parallel with Navigate Step 570. For example, each modification can be applied as modifications are found while navigating from one modification to another modification. By applying the modifications encountered during this navigation with track changes (e.g., redline) on, a version of the document showing differences between the states at each of the modifications can be produced.

In some embodiments, modifications by one author are highlighted while showing a final version of modifications by another author. In some embodiments, modifications made by the one author are highlighted using redline while showing the final version of modifications by another author.

Because Modification Record 440 may include information other than merely that stored in Change Field 460, it is possible to filter the modifications applied in Navigate Step 570. For example, the changes tracked could be specific to a particular user. Thus, all modifications made by "Jeff" could be selectively tracked, or all modifications made by users other than Jeff could be selectively tracked. Similarly, modifications that are approved or not yet approved by a document owner could be selectively tracked.

In an optional Provide Step 590, the version of the document produced by navigating Data Structure 410 is provided to a user for storage, display and/or further manipulation. This version is optionally the version at a destination modification and optionally includes tracked changes. The version may be supplied to the user for display using Display Logic 150.

In some embodiments, at least a subset of the operations shown in FIG. 5 is performed by a server, and the rest of the operations are performed by a client. In one example, the server performs operations 510 through 550, and the client performs operations 560 through 590. Alternatively, the server may perform operation 590 and the client may display the provided version. In another example, the client receives inputs from a user (e.g., operations 510, 540, and 560), and the server performs the rest of the operations. In yet another example, each of operations 510, 540, and 560 is performed by one of at least two or more clients, and the server performs the rest of the operations. In some embodiments, all operations discussed above with reference to FIG. 5 (except for optional operations not utilized in a particular embodiment) are performed by a client.

In some embodiments, the client displays a first version of a document and a control element. The client receives a user input moving the control element (e.g., operation 560). The client identifies a second version of the document in accordance with the movement of the control element (e.g., operation 570). The second version is distinct from the first version. The client displays the second version of the document (e.g., operation 590).

In some embodiments, the server sends to a respective client a first version of a document. The server receives, from a respective client, information representing a movement of a control element displayed at the respective client system (e.g., operation 560). The movement is by a user associated with the respective client. The server identifies a second version of the document in accordance with the received information (e.g., operation 570). The second version is distinct from the first version. The server sends to the respective client the second version of the document (e.g., operation 590).

Figure 6:
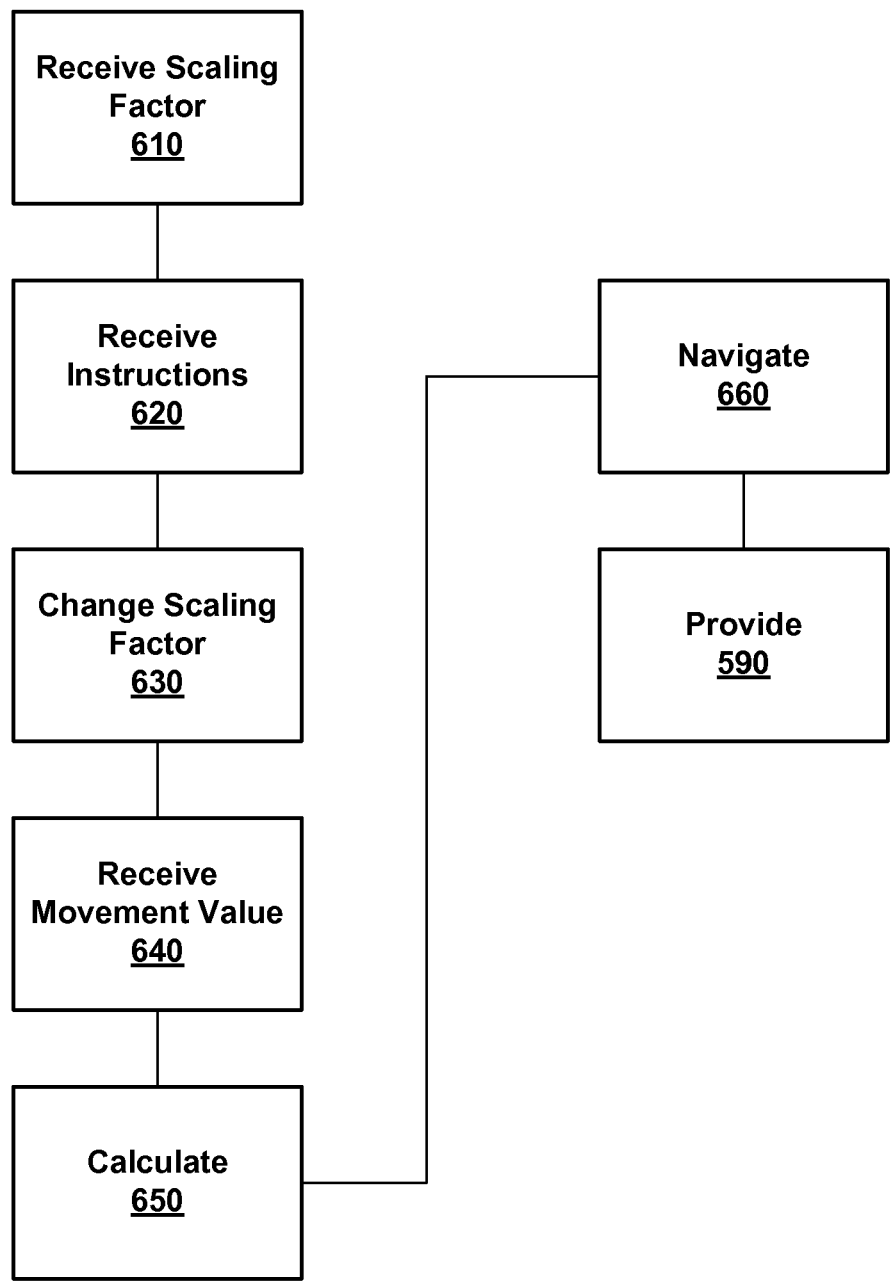
FIG. 6 is an illustration of a method of managing a document using a timeslider in accordance with some embodiments.

FIG. 6 is an illustration of a method of managing a document using a Timeslider 210 in accordance with some embodiments. In this method the scaling factor of a Timeslider 210 is used identify a destination modification within Data Structure 410. The method of FIG. 6 is optionally performed using Display Logic 150, Version Management Logic 170 and Revision History Storage 140. Display Logic 150 and Version Management Logic 170 may be executed on Processor 110 in order to perform the method.

In a Receive Scaling Factor Step 610 a scaling factor for Timeslider 210 is received. This factor is optionally a default value. It may be received from a user, an administrator, a configuration file, a data file, an executable file, a programmer, or the like.

In an optional Receive Instructions Step 620 instructions are received to change the scaling factor received in Receive Scaling Factor Step 610. These instructions may be received from Display Logic 150 and are optionally automatically executed. For example, an instruction to change the scaling factor by five percent may be automatically executed as the number of modifications represented by Timeslider 210 changes. Alternatively, the instructions to change the scaling factor may be executed in response to a user using a control (e.g., resolution control 230 shown in FIG. 2A). This control allows a user to zoom in and zoom out the resolution of Timeslider 210 by predetermined amounts.

In an optional Change Scaling Factor Step 630 the scaling factor received in Receive Scaling Factor Step 610 is changed responsive to the instructions received in Receive Instructions Step 620. This may increase or decrease the scaling factor. In some embodiments, the scaling factor is changed by a predetermined magnitude or percentage. Alternatively, the scaling factor may be changed in response to a value included in the instructions received in Receive Instructions Step 620. Change Scaling Factor Step 630 typically includes calculating a new scaling factor using Processor 110.

In a Receive Movement Value Step 640 a value representative of a position of Control Element 220 is received by Display Logic 150. In some embodiments, the value is received responsive to movement of Control Element 220 within a browser window. For example, a user may use a pointing device to move Control Element 220 from one position to a second position. The value received in Receive Movement Value Step 640 is representative of this second position.

In a Calculate Step 650 the scaling factor and the value received in Receive Movement Value Step 640 are used to calculate a number of revision steps or a revision index value. The calculation optionally includes multiplying the scaling factor by the value received using Processor 110. The number of revision steps is the number of Modification Records 440 navigated within Data Structure 410 from a current modification to a modification represented by the position of Control Element 220 within Timeslider 210. The revision index value is a data record table index to a modification represented by the position of Control Element 220.

In a Navigate Step 660 a Display Logic 150 and/or Version Management Logic 170 is used to navigate to a Modification Record 440 representative of the position of Control Element 220. This is accomplished by navigating the number of steps calculated in Calculate Step 650, or alternatively, by using the revision index value to look up a Modification Record 440 in a data table. Navigate Step 660 is optionally an example of Navigate Step 570 discussed elsewhere herein. As such, this navigation can include generation of a version of the document reflecting the modifications navigated.

Following Navigate Step 660, Provide Step 590 is optionally used to provide the version generated in Navigate Step 660.

In some embodiments, at least a subset of the operations shown in FIG. 6 is performed by a server, and the rest of the operations are performed by a client. In one example, the server performs operation 660, and the client performs operations 610 through 650. Either the server or the client may perform operation 590, depending on the implementation. In another example, the client performs receives inputs from a user (e.g., operations 610 and 640), and the server performs the rest of the operations. In some embodiments, all operations discussed above with reference to FIG. 6 (except for optional operations not implemented in particular embodiments) are performed by a client.

Several embodiments are specifically illustrated and/or described herein. However, it will be appreciated that modifications and variations are covered by the above teachings and within the scope of the appended claims without departing from the spirit and intended scope thereof. For example while the examples provided herein relate to the management of text within a text editing system, some embodiments are configured for other types of applications, such as image or video editors, computer aided design (CAD) systems, spreadsheets, presentation editors, database applications, drawing applications, or the like. In these embodiments Document Editing System 100 is replace by an appropriate system as will be apparent to one of ordinary skill in the art. A revision history may be stored as part of the associated document or separately from the document. A revision history may be branched. In alternative embodiments the features described here in as being part of Document Editing Logic 130, Display Logic 150, Conflict Resolution Logic 160 or Version Management Logic 170 are otherwise distributed among elements of Document Editing System 100.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The invention claimed is:

1. A method performed at a server, the method comprising:
    storing a document;
    receiving, from a client, first information representing a first movement of a control element displayed by the client, the first movement by a user associated with the respective client;
    identifying, in accordance with the received first information, a third-level change block, wherein the third-level change block represents a summation of a plurality of second-level change blocks;
    receiving, from the client, second information representing a second movement of the control element, the second movement by the user;

identifying, in accordance with the received second information, a second-level change block of the plurality of second-level change blocks, wherein the second-level change block represents a summation of a plurality of first-level modifications to the document;

receiving, from the client, third information representing a third movement of the control element, the third movement by the user;

identifying, in accordance with the received third information, a first-level modification of the plurality of first-level modifications; and identifying a version of the document based on the identified first-level modification.

2. The method of claim 1, wherein the control element is included in a timeslider displayed at the respective client system, the timeslider representing modifications to or versions of the document on a time-line.

3. The method of claim 2, wherein the movement of the control element is in accordance with a selection of a position on the timeslider by the user.

4. The method of claim 2, wherein the timeslider includes a first version marker corresponding to a first version and a second version marker corresponding to the identified version.

5. The method of claim 4, wherein the movement of the control element is in accordance with a selection of a version marker by the user.

6. The method of claim 2, further comprising automatically creating a version marker when a predefined condition is satisfied.

7. The method of claim 1, further comprising identifying a scaling factor,
wherein the identifying includes identifying the version of the document in accordance with the scaling factor and the received information.

8. The method of claim 1, further comprising:
receiving first-level modifications to the document made on the client while the client is offline; and
creating a version of the document in accordance with the first-level modifications to the document made while the respective client is offline.

9. A computer-implemented method, comprising:
storing a document;
displaying a control element;
receiving a first user input moving the control element;
identifying, in accordance with the first user input, a third-level change block, wherein the third-level change block represents a summation of a plurality of second-level change blocks;
receiving a second user input moving the control element;
identifying, in accordance with the second user input, a second-level change block of the plurality of second-level change blocks, wherein the second-level change block represents a summation of a plurality of first-level modifications to the document;
receiving a third user input moving the control element;
identifying, in accordance with the third user input, a first-level modification of the plurality of first-level modifications; and
identifying a second version of the document based on the identified first-level modification.

10. The method of claim 9, further comprising displaying a timeslider that includes the control element, the timeslider representing modifications to or versions of the document on a time-line.

11. The method of claim 10, wherein the control element is moved in accordance with a user selection of a position on the timeslider.

12. The method of claim 10, wherein the timeslider includes a first version marker corresponding to a first version and a second version marker corresponding to the identified version.

13. The method of claim 12, wherein the movement of the control element is in accordance with a user selection of a version marker.

14. The method of claim 10, further comprising automatically creating a version marker when a predefined condition is satisfied.

15. The method of claim 9, further comprising identifying a scaling factor,
wherein the identifying includes identifying the version of the document in accordance with the scaling factor and the movement of the control element.

16. A server, comprising:
a storage storing:
a document;
a memory storing computer program instructions; and
a processor configured to execute the computer program instructions which, when executed on the processor, cause the processor to perform operations comprising:
receiving, from the client, first information representing a first movement of a control element displayed by the respective client, the first movement by a user associated with the respective client;
identifying, in accordance with the received first information, a third-level change block, wherein the third-level change block represents a summation of a plurality of second-level change blocks;
receiving, from the client, second information representing a second movement of the control element, the second movement by the user;
identifying, in accordance with the received second information, a second-level change block of the plurality of second-level change blocks, wherein the second-level change block represents a summation of a plurality of first-level modifications to the document;
receiving, from the client, third information representing a third movement of the control element, the third movement by the user;
identifying, in accordance with the received third information, a first-level modification of the plurality of first-level modifications; and
identifying a version of the document based on the identified first-level modification.

17. A computer system, comprising:
a storage storing:
a document;
a memory storing computer program instructions; and
a processor configured to execute the computer program instructions which, when executed on the processor, cause the processor to perform operations comprising:
displaying a control element;
receiving a first user input moving the control element;
identifying, in accordance with the first user input, a third-level change block, wherein the third-level change block represents a summation of a plurality of second-level change blocks;
receiving a second user input moving the control element;
identifying, in accordance with the second user input, a second-level change block of the plurality of second-level change blocks, wherein the second-level change block represents a summation of a plurality of first-level modifications to the document;
receiving a third user input moving the control element;
identifying, in accordance with the third user input, a first-level modification of the plurality of first-level modifications; and
identifying a version of the document based on the identified first-level modification.

18. A non-transitory computer readable storage medium having program instructions stored thereon, that, in response to execution by a processor, cause the processor to perform operations comprising:
storing:
a document;
receiving, from a client, first information representing a first movement of a control element displayed by the client, the first movement by a user associated with the respective client;
identifying, in accordance with the received first information, a third-level change block, wherein the third-level change block represents a summation of a plurality of second-level change blocks;
receiving, from the client, second information representing a second movement of the control element, the second movement by the user;
identifying, in accordance with the received second information, a second-level change block of the plurality of second-level change blocks, wherein the second-level change block represents a summation of a plurality of first-level modifications to the document;
receiving, from the client, third information representing a third movement of the control element, the third movement by the user;
identifying, in accordance with the received third information, a first-level modification of the plurality of first-level modifications; and
identifying a version of the document based on the identified first-level modification.

19. A non-transitory computer readable storage medium having program instructions stored thereon, that, in response to execution by a processor, cause the processor to perform operations comprising:
storing:
a document;
displaying a control element;
receiving a first user input moving the control element;
identifying, in accordance with the first user input, a third-level change block, wherein the third-level change block represents a summation of a plurality of second-level change blocks;
receiving a second user input moving the control element;
identifying, in accordance with the second user input, a second-level change block of the plurality of second-level change blocks, wherein the second-level change block represents a summation of a plurality of first-level modifications to the document;
receiving a third user input moving the control element;
identifying, in accordance with the third user input, a first-level modification of the plurality of first-level modifications;
identifying a version of the document based on the identified first-level modification.

* * * * *